United States Patent
Haq et al.

(10) Patent No.: US 11,939,246 B1
(45) Date of Patent: Mar. 26, 2024

(54) METHOD OF REMOVING POLLUTANTS FROM WATER USING WASTE POLYETHYLENE TEREPHTHALATE

(71) Applicant: KING SAUD UNIVERSITY, Riyadh (SA)

(72) Inventors: Nazrul Haq Rizwanul Haq, Riyadh (SA); Fars Kaed Alanazi, Riyadh (SA); Ibrahim Abdullah Alsarra, Riyadh (SA); Muzaffar Iqbal Abu Zafar, Riyadh (SA); Mohammad Raish, Riyadh (SA); Faiyaz Shakeel Shakeel Ahmad, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/195,692

(22) Filed: May 10, 2023

(51) Int. Cl.
*C02F 1/56* (2023.01)
*C02F 1/66* (2023.01)
*C02F 1/68* (2023.01)
*C08G 18/42* (2006.01)
*C02F 1/28* (2023.01)
*C02F 101/22* (2006.01)
*C02F 101/30* (2006.01)
*C02F 103/34* (2006.01)
*C08J 11/16* (2006.01)

(52) U.S. Cl.
CPC .......... *C02F 1/56* (2013.01); *C02F 1/66* (2013.01); *C02F 1/683* (2013.01); *C08G 18/4213* (2013.01); *C02F 1/285* (2013.01); *C02F 2101/22* (2013.01); *C02F 2101/308* (2013.01); *C02F 2103/343* (2013.01); *C08J 11/16* (2013.01); *C08J 2367/02* (2013.01)

(58) Field of Classification Search
None
See application file for complete search history.

(56) References Cited

U.S. PATENT DOCUMENTS

2020/0115545 A1  4/2020  Tiwari et al.

FOREIGN PATENT DOCUMENTS

| CN | 106750331 A | 5/2017 |
| CN | 108211810 A | 6/2018 |
| RU | 2359920 C1 | 6/2009 |

OTHER PUBLICATIONS

Oku et al. (Journal of Applied Polymer Science, 1997, 63, 595-601). (Year: 1997).*

(Continued)

*Primary Examiner* — Clare M Perrin
(74) *Attorney, Agent, or Firm* — Nath, Goldberg & Meyer; Richard C. Litman

(57) ABSTRACT

A method for removing at least one pollutant from an aqueous environment comprises adding an acid to the aqueous environment to provide an acidic aqueous environment, adding a chelator solution directly to the acidic aqueous environment to achieve a precipitate of the at least one pollutant, and isolating the precipitate from the aqueous environment. The at least one pollutant may include any one or more of a heavy metal cation, an organic dye, and an active pharmaceutical ingredient.

12 Claims, 4 Drawing Sheets

(56) References Cited

OTHER PUBLICATIONS

Djahed et al. "A novel and inexpensive method for producing activated carbon from waste polyethylene terephthalate bottles and using it to remove methylene blue dye from aqueous solution," Desalination and Water Treatment, vol. 57, Issue 21, Apr. 20, 2015.

Oku, A., Hu, L. C., & Yamada, E. (1997). Alkali decomposition of poly (ethylene terephthalate) with sodium hydroxide in nonaqueous ethylene glycol: a study on recycling of terephthalic acid and ethylene glycol. Journal of Applied Polymer Science, 63(5), 595-601.

Din, S. F. M., Othman, N., Mohamad, Z., Man, S. H. C., Abd Karim, K. J., & Hassan, A. (2020). Recycled Poly (ethylene terephthalate) as Dye Adsorbent: A Mini-Review. Chemical Engineering Transactions, 78, 367-372.

Paszun, D., & Spychaj, T. (1997). Chemical recycling of poly (ethylene terephthalate). Industrial & engineering chemistry research, 36(4), 1373-1383.

\* cited by examiner

METHOD OF REMOVING POLLUTANTS FROM WATER USING WASTE POLYETHYLENE TEREPHTHALATE

BACKGROUND

Field

The disclosure of the present patent application relates to a method for removing pollutants from water, and particularly, to a method of removing pollutants form water using a composition derived from waste polyethylene terephthalate.

Description of the Related Art

Water pollution can result from the introduction of physical, chemical, and biological substances into natural bodies of water. Water pollution negatively impacts ecosystems and living organisms that interact with the bodies of water. Many heavy metal ions, dyes and active pharmaceutical ingredients are common water pollutants with potential toxic and otherwise environmentally and ecologically harmful effects.

Heavy metals are commonly used in major technological industries and constitute substantial water pollution. For example, heavy metals discharged in the process of electroplating, such as chromium, copper, nickel, cadmium and zinc, commonly pollute water systems and can be harmful to human beings, animals and crops.

Organic dyes often contaminate wastewater from, for example, textile manufacturing, cosmetics synthesizing, printing, dyeing, food coloring, and paper making. About 1-15% of dyes are lost during the dyeing process in the textile industry and are eventually released in wastewater that contaminates both surface water and ground water. Organic dyes, such as Congo red, methyl blue, methylene blue, malachite green, rhodamine B, bromophenol blue and rose Bengal dyes, are toxic and may cause cancer and other health side effects for both human and aquatic life. Dyes, when discharged into receiving streams, will generally cause detrimental effects on the liver, gill, kidney, intestine, gonads and pituitary gonadotrophic cells of aquatic life. In humans, they may cause irritation to the respiratory tract if inhaled, and irritation to the gastrointestinal tract if ingested. Contact of dyes with skin and eyes may cause irritation with redness and even permanent injury. The toxicities of Congo red, malachite green, rhodamine B, bromophenol blue, and rose Bengal dyes to humans include carcinogenicity, reproductive and developmental toxicity, neurotoxicity and acute toxicity.

Other common organic wastewater contaminants include pharmaceuticals and personal care products, such as antibiotics (e.g., ciprofloxacin, levofloxacin, sulfamethoxazole) often found in surface waters and veterinary pharmaceuticals that enter the water via manure dispersion and animal excretion onto soils. Antibiotics in natural waters contribute to the spread of antibiotic resistance in microorganisms.

Neutralized precipitation, currently the most common strategy for removal of heavy metal water contaminants, has several disadvantages: (1) heavy metal wastewater is usually acidic, and neutralization must raise the wastewater pH above 10; (2) many different heavy metal ions often co-exist in electroplating wastewater, and precipitation of each type of heavy metal ion would ideally be performed at a respective optimal pH value; and (3) hydroxide precipitation in the alkaline medium may be leached out again as the pH value changes in the course of discharging, which may cause secondary pollution.

Many organic water pollutants also resist conventional removal or degradation. Existing methods of removing or degrading organic contaminants in water include, among others, nanofiltration, reverse osmosis, adsorption, ozonation and chemical oxidation. Ozonation and chemical oxidation can lead to the formation of oxidation intermediates that are often unknown as far as composition or toxicity. In adsorption technology, inorganic adsorbents are often employed, as they offer advantages of stability towards subsequent radioactive and thermal treatments, which are often used to completely degrade adsorbates, allowing for regeneration of adsorbents.

Since most organic dyes have high water solubility, they are generally difficult to remove by usual waste-treatment systems. Efficient, rapid, cost-effective, and environmentally friendly removal of dyestuff from aqueous media is needed. Some existing methods of removing synthetic dyes from water often involve adsorption on inorganic or organic matrices, decolorization by photocatalysis and/or by oxidation, microbiological or enzymatic decomposition. Chemical oxidation, for example, can be efficient, depending strongly on the type of oxidant.

Alternatives methods for decontaminating waters are based on extraction with solvents, reverse osmosis, and adsorption on inorganic and organic supports of various sizes, such as micro- or nano-adsorbents. Nano-adsorbents composed of polymers, inorganic materials or carbon have been developed for separating stable, recalcitrant, colorant and potentially carcinogenic dyes from wastewater. However, nano-adsorbents have been found to be greatly limited in requiring an additional separation step to remove the adsorbent from the solution.

Thus, a method for removing heavy metal ions, organic dyes and active pharmaceutical ingredients from wastewater solving the aforementioned problems is desired.

SUMMARY

An embodiment of the present subject matter is directed to a method for removing at least one pollutant from an aqueous environment using a chelator solution. The chelator solution can include decomposed polyethylene terephthalate (PET). The method for removing the at least one pollutant from an aqueous environment comprises adding an acid to the aqueous environment to provide an acidic aqueous environment, adding the chelator solution directly to the acidic aqueous environment to form a pollutant precipitate, and isolating the precipitate from the aqueous environment. The at least one pollutant may include any one or more of a heavy metal cation, an organic dye, and an active pharmaceutical ingredient in the aqueous environment. After removal of the precipitate, the aqueous environment may be further treated, processed or disposed of in any other desired manner, for example, by removal of other contaminants and pollutants by wastewater treatment facilities.

In embodiments of the present method, the composition can be prepared by degrading a PET source. In particular embodiments, the PET source includes waste PET from previously used PET products.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
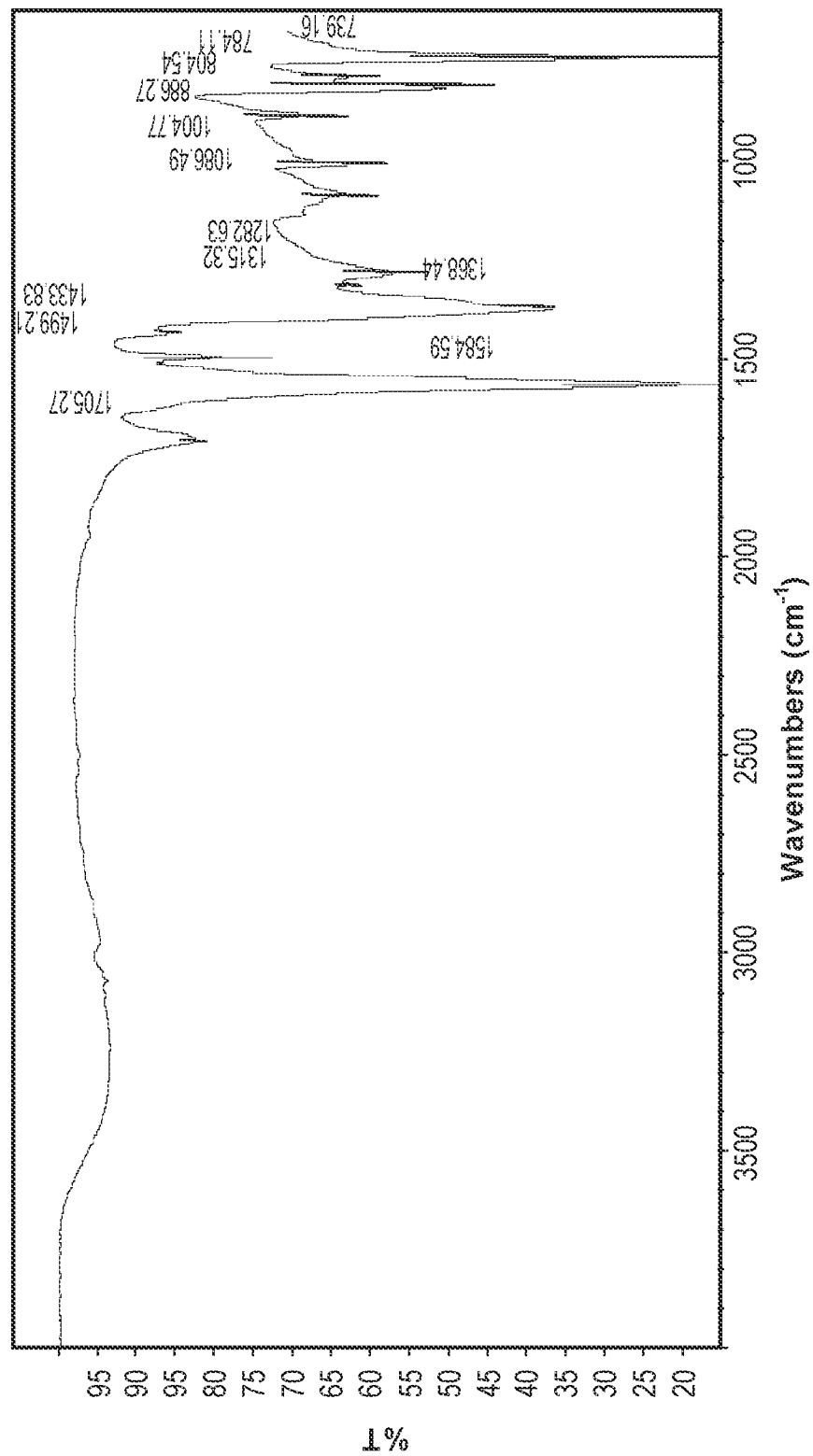
FIG. 1 depicts the Fourier transform infrared spectroscopy (FTIR) spectra of the as prepared composition alone.

An embodiment of the present subject matter is directed to a method for removing at least one pollutant from an aqueous environment using a chelator solution. The chelator solution can include an alkali decomposed polyethylene terephthalate (PET). The method for removing the at least one pollutant from an aqueous environment can include adding an acid to the aqueous environment to provide an acidic aqueous environment, adding the chelator solution directly to the acidic aqueous environment to achieve a precipitate of the at least one pollutant, and isolating the precipitate from the aqueous environment. The at least one pollutant may include any one or more of a heavy metal cation, an organic dye, and an active pharmaceutical ingredient. The aqueous environment can include wastewater or a natural water body contaminated with wastewater.

In embodiments of the present method, the chelator solution can be prepared by degrading a PET source. PET is the most common thermoplastic polymer resin of the polyester family and is used in fibers for clothing, containers for liquids and foods, thermoforming for manufacturing, and in combination with glass fiber for engineering resins. In particular embodiments, the PET source includes waste PET from previously used PET products.

The chelator solution can be synthesized by alkaline decomposition of the PET source. The alkaline decomposition of the PET source can include disposing the PET source in non-aqueous media to provide a reaction mixture, heating the reaction mixture to provide a heated liquid, and adding water to the heated liquid to provide the chelator solution. The heated liquid can be milky white. The chelator solution can be a clear solution. Any non-solubilized or non-degraded substance can be removed from the clear solution. In a particular embodiment, the non-aqueous media can include anhydrous ethylene glycol and an alkali. The reaction mixture can be heated to boiling and maintained at a boil for a time. In an embodiment, a temperature of the mixture to be maintained at a boil may be at least about 195° C., and in a particular embodiment, the temperature is 200° C.±5° C. In another embodiment, the time of boiling is at least about 20 minutes and in a particular embodiment, the time is 25 min±5 min. The alkali may be any suitable alkali, such as sodium hydroxide (NaOH), and should be added in an amount to achieve an alkaline pH.

Regarding suitability, sodium hydroxide, does not pose any threat to the environment. In water (including soil or sediment pore water), sodium hydroxide is present as sodium ions ($Na^+$) and hydroxide ions ($OH^-$). As a solid, NaOH rapidly dissolves and subsequently dissociates in water. If emitted into air as an aerosol, NaOH can be rapidly neutralized by reacting with carbon dioxide ($CO_2$). Resulting salts (e.g., sodium (bi)carbonates) can precipitate out of the air. Thus, atmospheric emissions can largely end up in soil and water. In soil, sorption to soil particles can be negligible. Depending upon the buffer capacity of the soil, $OH^-$ can be neutralized in soil pore water or the pH may be increased, causing minimal environmental disturbance. Environmentally friendly alkali other than NaOH may alternatively be used.

Ethylene glycol does not persist in large amounts in ambient air because breakdown is rapid (half-life in air is 8-84 hours). In environmental exposure situations, low vapor pressure precludes substantial inhalation exposure at ambient temperatures, and poor skin absorption prevents significant absorption after dermal contact. Ethylene glycol is miscible with water and can leach through soil to groundwater. It biodegrades rapidly in soil (half-life, 2-12 days), surface water (half-life, 2-12 days) and ground water (half-life, 4-24 days). Because ethylene glycol is not fat soluble and biodegrades rapidly, bioconcentration and bioaccumulation are insignificant.

The amounts of materials for the methods described herein are exemplary, and appropriate scaling of the amounts are encompassed by the present subject matter, as long as the relative ratios of materials are maintained. As used herein, the term "about," when used to modify a numerical value, means within ten percent of that numerical value. The following examples illustrate the present teachings.

EXAMPLES

Example 1

Synthesis of Composition for Removal of Contaminants from an Aqueous Environment To produce the composition for removal of contaminants from an aqueous environment or chelator solution, waste PET from previously used water bottles were cut into small pieces, approximately 0.5 cm×0.5 cm. The PET pieces (22 g) were heated in anhydrous (non-aqueous) ethylene glycol (55 mL) with at least 2 equivalents of NaOH as the alkali to provide a reaction mixture including PET pellets. The reaction mixture was heated until boiling, and then maintained at a boil for a sufficient time for the PET pieces to decompose. In the present example, the reaction mixture was maintained at ~200° C. for about 25 min. During the heating, the pieces of PET decomposed and the heated mixture turned milky white, presumably indicating decomposition of the PET. The heating was stopped after the 25 minutes and ~250 mL of deionized water was added into the mixture and stirred vigorously at room temperature until the milky-white liquid was converted into a clear solution. The clear solution was filtered through a Whatman paper (No. 42). The resulting filtered solution was directly used as the chelator solution or composition added to the aqueous environment for removal of exemplary heavy metal ions, organic dyes and active pharmaceutical ingredients. It should be understood that the exemplary composition prepared as above is also referred to herein as the chelator solution "CS".

Example 2

Demonstration of the Method for Removing Heavy Metals. Organic Dyes and Active Pharmaceutical Ingredients Aqueous solutions including heavy metal ions (copper, chromium, lead, silver) and organic dyes (crystal violet, malachite green, methylene blue, safranin) were prepared at 100 ppm concentration at room temperature using doubly distilled deionized water as the solvent. Aqueous solutions of APIs (poiglitazone, pantoprazole and propanolol) were prepared by dissolving the API, respectively, in a minimal volume of methanol and then adding enough doubly distilled deionized water to achieve a final API concentration of 50 ppm. The aqueous solutions including the pollutants were slightly acidified by adding acetic acid to a final 1:100 (v/v) ratio to produce exemplary acidified solutions, unless noted otherwise.

To test removal efficiency and efficacy of the exemplary composition and method, various volumes of the exemplary composition were directly added to the acidified solutions including the pollutants (heavy metal ions, organic dyes and APIs (column 2 in Tables 1-2)). Exemplary results of the effects of adding varying amounts of CS are provided for the exemplary organic dyes (Tables 1 and 2, respectively). In general, to a point, the percentage of pollutant removal increases with increasing CS added, but even very small amounts of CS remove substantial levels of pollutants.

Figure 3:
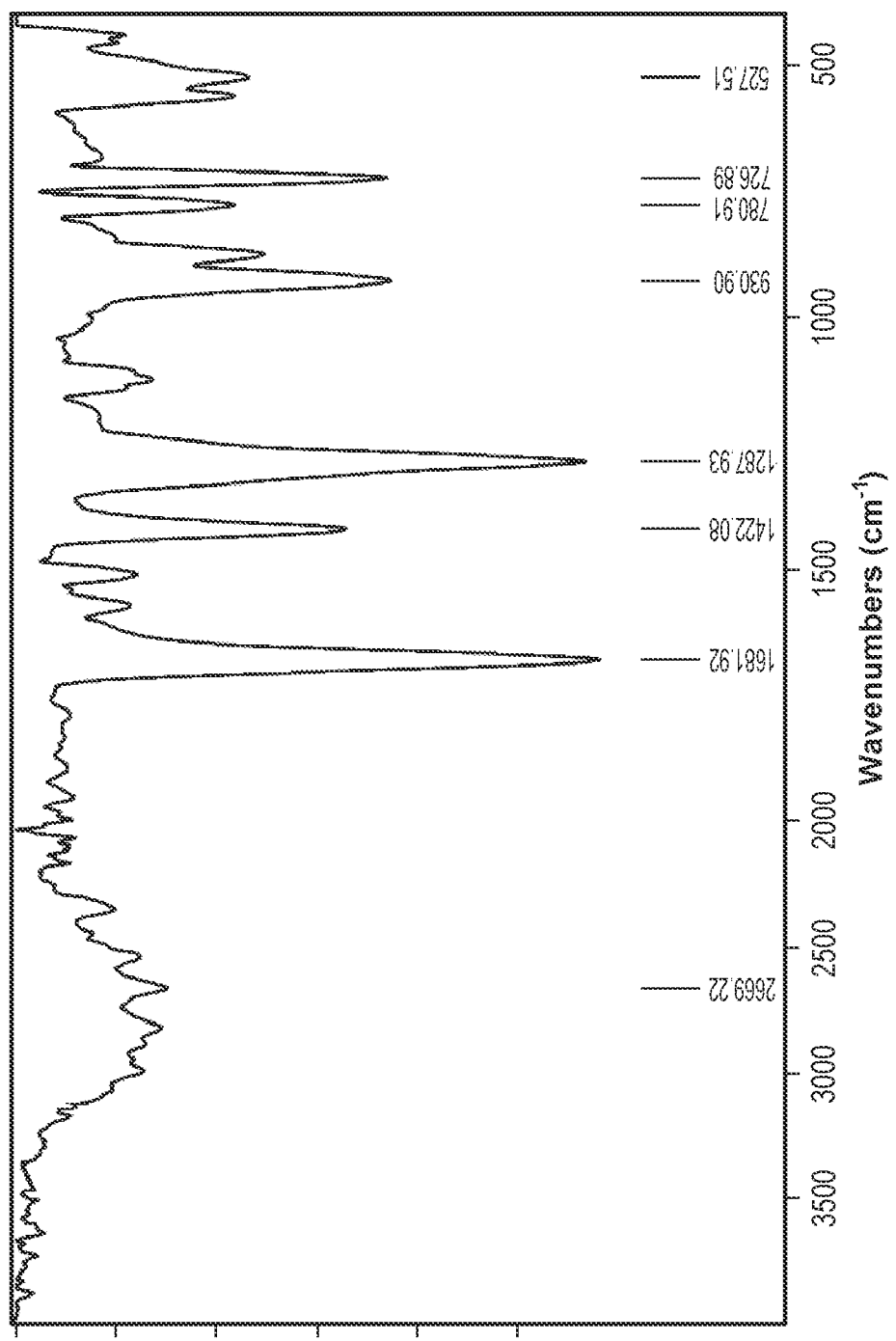
FIG. 3 depicts the Fourier transform infrared spectroscopy (FTIR) spectra of the as prepared composition precipitated with copper (heavy metal ion).

In the case of exemplary heavy metal ion $Cu^{2+}$, precipitation of pollutants was quickly evident for each volume of exemplary composition added, as shown in FIG. 3. Results for the heavy metals tested are found in Table 1. The copper solution was colored before addition of the exemplary composition and became nearly clear upon the addition of the exemplary composition in each amount. Solid precipitate comprising the heavy metal was carefully removed from the exemplary acidified solutions by centrifugation to produce a supernatant and a pellet. The supernatant was analyzed for concentration of remaining heavy metal ions in the solution after precipitation by inductively coupled plasma mass spectrometry (ICP-MS).

TABLE 1

Removal of heavy metal pollutant from purified water using CS of different volumes

| Metal | Volume of CS added (µl) | Initial Conc. of pollutant in 1 ml solution (ppm) | Percentage removal |
|---|---|---|---|
| Copper | 100 | 100 | 48.7 |
| | 250 | 100 | 60.85 |
| | 500 | 100 | 71.39 |
| | 1000 | 100 | 82.06 |
| Lead | 100 | 100 | 11.63 |
| | 250 | 100 | 45.85 |
| | 500 | 100 | 58.50 |
| | 1000 | 100 | 69.23 |
| Chromium | 100 | 100 | 83.46 |
| | 250 | 100 | 84.03 |
| | 500 | 100 | 88.39 |
| | 1000 | 100 | 91.26 |
| Nickel | 100 | 100 | 74 |
| | 250 | 100 | 82.5 |
| | 500 | 100 | 87 |
| | 1000 | 100 | 90 |
| Cobalt | 100 | 100 | 80.12 |
| | 250 | 100 | 80.75 |
| | 500 | 100 | 87.81 |
| | 1000 | 100 | 91.98 |

Figure 2:
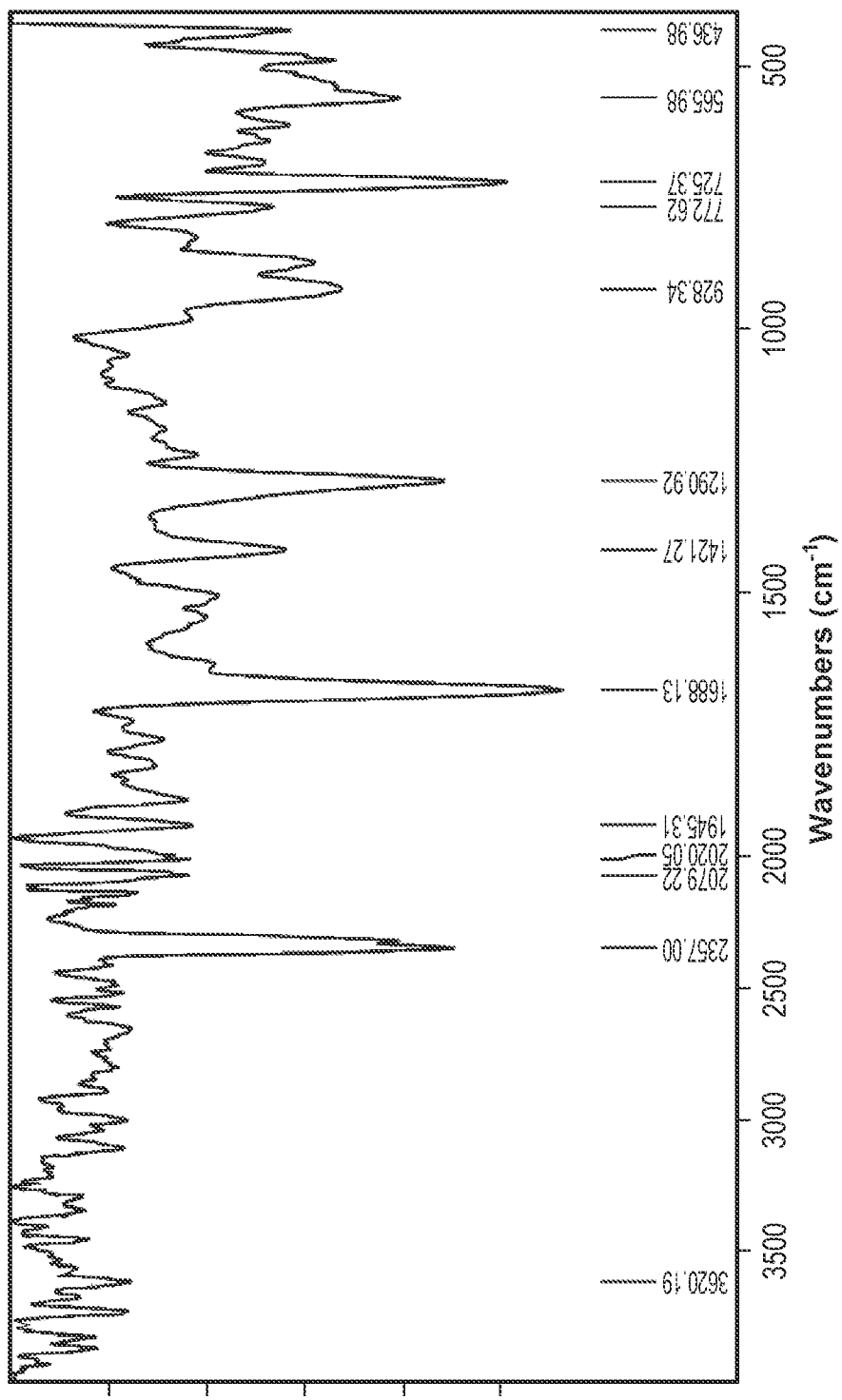
FIG. 2 depicts the Fourier transform infrared spectroscopy (FTIR) spectra of the as prepared composition precipitated with crystal violet (organic dye).

Aqueous solutions of the five dyes (crystal violet, malachite green, methylene blue, safranin, respectively) were prepared at 100 ppm concentration at room temperature using doubly distilled deionized water. The UV-Vis molecular absorption spectra of the dye solutions were obtained. These dyes solutions were slightly acidified by adding acetic acid in 1:100 (v/v) ratio. To these acidified solution of dyes, varying volumes of CS were directly added. Immediate precipitation of all dyes was clear in each case. As shown in FIG. 2, the colored dye solutions became nearly clear upon the addition of the CS. Solid precipitated dye complexes were carefully removed from the solutions by centrifugation and the supernatant was analyzed for concentration of dyes remaining in the solution after precipitation by UV-VIS spectrometry. Exemplary results are provided in Table 2 below.

TABLE 2

Removal of organic dye pollutants from purified water using CS of different volumes

| Dyes | Volume of CS added (µl) | Initial Conc. of pollutant in 01 ml solution (ppm) | Percentage removal |
|---|---|---|---|
| Nigrosine | 100 | 100 | 50.30043 |
| | 250 | 100 | 83.90558 |
| | 500 | 100 | 81.09871 |
| | 1000 | 100 | 94.6309 |
| Methylene Blue | 100 | 100 | 61.27143 |
| | 250 | 100 | 93.08571 |
| | 500 | 100 | 97.88571 |
| | 1000 | 100 | 99.06429 |
| Safranin | 100 | 100 | 70.50132 |
| | 250 | 100 | 98.42568 |
| | 500 | 100 | 99.89563 |
| | 1000 | 100 | 100.00156 |
| Malachite Green | 100 | 100 | 21.8742 |
| | 250 | 100 | 81.15533 |
| | 500 | 100 | 95.89217 |
| | 1000 | 100 | 97.59307 |
| Crystal Violet | 100 | 100 | 88.82394 |
| | 250 | 100 | 94.92254 |
| | 500 | 100 | 95.57746 |
| | 1000 | 100 | 95.67606 |

Precipitation experiments at acidification levels (exemplary aqueous environments acidified by different volumes of acetic acid, i.e., different pH) of conditions was also conducted. Exemplary results are provided for malachite green in Table 3 below.

TABLE 3

Effect of varying initial acid volume added on percentage of malachite green removed

| Volume of acetic acid added (µl) | Volume of CS added (µl) | Initial Conc. of malachite green in 1 ml solution (ppm) | Percentage removal |
|---|---|---|---|
| 10 | 200 | 100 | 94.46598 |
| 25 | 200 | 100 | 96.16816 |
| 50 | 200 | 100 | 97.59307 |
| 75 | 200 | 100 | 98.34403 |
| 100 | 200 | 100 | 98.27856 |

In order to observe the role of pH modification on the efficiency of the precipitation process, different volume ratios of acetic acid were added to the malachite green solution (used as a model system) for the purpose of acidification. Then, the precipitation process was performed as described. Increased acid added improved pollutant removal, but for all tested acidified solutions, removal was significant.

Figure 4:
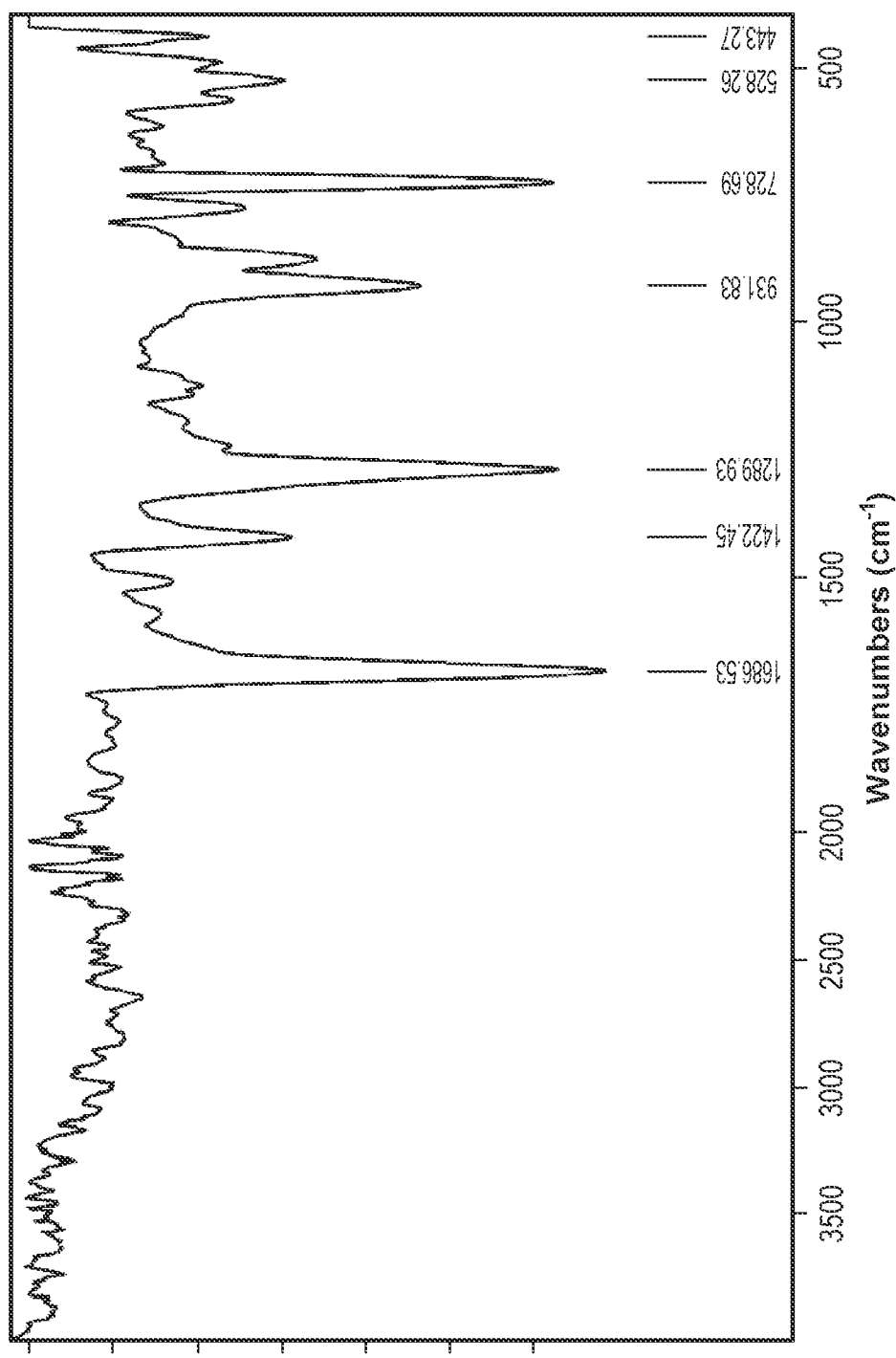
FIG. 4 depicts the Fourier transform infrared spectroscopy (FTIR) spectra of the as prepared composition precipitated with propranolol (active pharmaceutically ingredient).

Similarly, aqueous solutions of the three APIs (poiglitazone, pantoprazole and propranolol) were prepared at 50 ppm concentration at room temperature using doubly distilled deionized water. These drug solutions were slightly acidified by adding acetic acid in 01:100 (v/v) ratio. To these acidified solutions of drugs, varying volumes of CS were directly added. Immediate precipitation of drugs was clear in each case, as demonstrated in FIG. 4 for one of the drugs, propranolol. Solid precipitated drug complexes were carefully removed from the solutions by centrifugation and the supernatant was analyzed for concentration of drugs remaining in the solution after precipitation.

TABLE 4

Removal of API pollutants of different concentrations from purified water using CS

| API | Volume of CS added (μl) | Initial Conc. of pollutant in 1 ml solution (ppm) | Percentage removal |
|---|---|---|---|
| Pantoprazole | 200 | 1 | 98.43637 |
|  | 200 | 10 | 99.07707 |
|  | 200 | 20 | 99.08162 |
|  | 200 | 50 | 98.96689 |
| Propranolol | 200 | 1 | 100.8656 |
|  | 200 | 10 | 98.83141 |
|  | 200 | 20 | 98.70243 |
|  | 200 | 50 | 98.72427 |
| Pioglitazone | 200 | 1 | 99.73057 |
|  | 200 | 10 | 98.69985 |
|  | 200 | 20 | 98.75783 |
|  | 200 | 50 | 96.90511 |

The percent of heavy metal ions, organic dye molecules and API removed from solution after the completion of precipitation was computed as follows:

$$\% \text{ pollutant removal} = \frac{c_i - c_f}{c_i} \times 100\%$$

where Ci is the P initial concentration and Cf is the final concentration (ppm) of heavy metal ions, organic dye molecules or API molecules, as relevant.

To check the efficiency of the present process for removing pollutants from generic aqueous environments, the present method was applied to wastewater spiked with solutions of metal ions, dyes and APIs. The wastewater was collected from the wastewater treatment facility of King Saud University. Table 5 provides information regarding the composition of the wastewater.

TABLE 5

Composition of wastewater used in spiking experiments

| Parameters | Concentration |
|---|---|
| pH | 7.5 |
| Turbidity (Nephelometric Turbidity Unit) | 591 |
| Total Dissolved Solids (mg/L) | 380 |
| Biological Oxygen Demand (mg/L) | 292 |
| Chemical Oxygen Demand (mg/L) | 560 |
| $NH_3$—N (mg/L) | 39.8 |
| $NO_3$—N (mg/L) | 4.7 |
| Total Kjeldahl nitrogen (mg/L) | 43.1 |
| Oil & Grease (mg/L) | 29.7 |

The wastewater collected was spiked individually with each pollutant to ensure presence of the pollutant in a detectable range. Negligible amounts of each pollutant were assumed to be originally present in the wastewater. Precipitation experiments were carried out as above. The results are provided in Table 6.

TABLE 6

Removal of pollutants from wastewater solutions

| Pollutant | | Initial Conc. (ppm) | Volume of CS added (μl) | Volume of acetic acid added (μl) | % Removal (ppm) (Wastewater) |
|---|---|---|---|---|---|
| Organic Dyes | Nigrosine | 100 | 200 | 10 | 99.01788 |
|  | Methylene Blue | 100 | 200 | 10 | 99.0013 |
|  | Safranin | 100 | 200 | 10 | 99.00156 |
|  | Malachite Green | 100 | 200 | 10 | 99.01042 |
|  | Crystal Violet | 100 | 200 | 10 | 99.00331 |
| Heavy Metal | Copper | 100 | 200 | 10 | 82.1368 |
|  | Chromium | 100 | 200 | 10 | 65.71162 |
|  | Lead | 100 | 200 | 10 | 55.0905 |
| API | Pantoprazole | 50 | 200 | 10 | 99.07707 |
|  | Propranolol | 50 | 200 | 10 | 99.76628 |
|  | Pioglitazone | 50 | 200 | 10 | 99.83438 |

It is to be understood that the present method is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for removing at least one pollutant from an aqueous environment comprising said at least one pollutant, the method comprising:
adding an acid to the aqueous environment to provide an acidic aqueous environment;
adding a chelator solution to the aqueous environment to provide a precipitate of the at least one pollutant, the chelator solution including a decomposed polyethylene terephthalate; and
separating the precipitate from the aqueous environment.

2. The method of claim 1, wherein the at least one pollutant comprises at least one of heavy metals, organic dyes and active pharmaceutical ingredients.

3. The method of claim 2, wherein the at least one pollutant comprises heavy metals.

4. The method of claim 3, wherein the heavy metals comprise at least one metal selected from the group consisting of Fe, Pb, Cu, Co, Ni and Cr.

5. The method of claim 2, wherein the at least one pollutant comprises organic dyes.

6. The method of claim 5, wherein the organic dyes comprise at least one dye selected from the group consisting of safranin, malachite green, methylene blue, crystal violet, and nigrosine.

7. The method of claim 2, wherein the at least one pollutant comprises active pharmaceutical ingredients.

8. The method of claim 7, wherein the active pharmaceutical ingredients comprise at least one active pharmaceutical ingredient selected from the group consisting of pioglitazone, pantoprazole and propanolol.

9. The method of claim 1, wherein the chelator solution is prepared by:
disposing the polyethylene terephthalate in a non-aqueous media to provide a reaction mixture;
heating the reaction mixture to provide a heated liquid; and adding water to the heated liquid to provide the chelator solution.

10. The method of claim 9, wherein the non-aqueous media comprises anhydrous ethylene glycol and an alkali.

11. The method of claim 10, wherein the alkali comprises sodium hydroxide.

12. The method of claim 9, wherein the reaction mixture is heated to at least about 195° C.

\* \* \* \* \*